United States Patent [19]

Williams et al.

[11] Patent Number: 4,993,048

[45] Date of Patent: Feb. 12, 1991

[54] SELF-CLOCKING SYSTEM

[75] Inventors: Bruce H. Williams, Sandy; Glenn A. Arbanas, Salt Lake City; Valjean P. Snyder, West Valley City, all of Utah

[73] Assignee: Unisys Corporation, Blue Bell, Pa.

[21] Appl. No.: 510,526

[22] Filed: Apr. 18, 1990

[51] Int. Cl.⁵ .................................... H04L 27/06
[52] U.S. Cl. ................................ 375/97; 375/120; 331/1 R
[58] Field of Search ............... 375/97, 119, 120, 121; 370/84; 360/51; 331/1 R, 1 A, 17, 25, 34; 328/133, 135, 72, 73, 63; 307/511, 521, 522

[56] References Cited

U.S. PATENT DOCUMENTS

| | | | |
|---|---|---|---|
| 3,831,195 | 8/1974 | Davis et al. | 360/51 |
| 4,205,277 | 5/1980 | Poinas | 331/17 |
| 4,300,173 | 11/1981 | Harris et al. | 360/51 |
| 4,534,044 | 8/1985 | Funke et al. | 375/120 |
| 4,683,445 | 7/1987 | Erickson | 331/17 |
| 4,737,866 | 4/1988 | Ebata | 375/120 |
| 4,862,299 | 8/1989 | Hagita | 331/17 |

Primary Examiner—Douglas W. Olms
Assistant Examiner—Stephen Chin
Attorney, Agent, or Firm—Whitham & Marhoefer

[57] ABSTRACT

Self-clocking system for demodulating phase encoded data automatically tracks incoming data rate changes by using information from a bit synchronizer to track the incoming base band data signal.

3 Claims, 3 Drawing Sheets

SELF-CLOCKING SYSTEM

BACKGROUND OF THE INVENTION

1. Field of the Invention

The present invention generally relates to modulator/demodulator systems (i.e. modems), and more particularly to a self-clocking demodulator for recovering phase encoded digital data.

2. Description of the Prior Art

Modem systems commonly used today transmit digital data by phase encoding the digital data on an analogue carrier signal. The digital data rate may vary and the modulator and demodulator must be simultaneously configured for a selected data rate. Our invention uses a phase locked loop to lock onto a received stream of data bits whose rate can vary over a wide range. The following patents disclose phase lock loop systems which are illustrative of the prior art.

U.S. Pat. No. 4,375,693 to Kuhn discloses an adaptive sweep bit synchronizer capable of acquisition and operation over an arbitrarily broad range of data rates.

U.S. Pat. No. 4,855,683 to Troudet et al., discloses digital phase locked loop circuit with bounded jitter. FIG. 2 shows a controller 217 increasing the frequency of a VCO 201 in response to signals from a frequency window comparator 208.

U.S. Pat. No. 4,816,774 to Martin shows a frequency synthesizer with compensation. FIG. 1 shows the PLL has a programmable divider 16 for varying values to the divider for fractional division to produce a desired output frequency.

U.S. Pat. No. 4,668,922 to Crawford et al., shows a fast phase lock frequency synthesizer. FIG. 1 shows the use of a divide by N control.

U.S. Pat. No. 4,654,859 to Kung et al., discloses a frequency synthesizer for a frequency hopping communication system. FIG. 1 shows a microprocessor controller connected to a programmable divider of the PLL.

U.S. Pat. No. 4,636,747 to Selim discloses a system and method for wideband, continuous tuning of an oscillator. The oscillator is continuously tuned over its entire operating range by controlling a resolver in the feedback loop around the oscillator.

The Japanese patent abstract to Kanzaki, No. JAO221714, shows a discriminator 5 detecting an input signal A and an output signal B of the VCO 3. A synchronizing frequency detector 6, a correction voltage generating circuit, and a voltage adder circuit 8 are used to make the output frequency coincident with the reception frequency. Japanese patent abstract to Mori, No. JAO121318, shows reset timing generation circuit connected to the divider 12 of the phase locked loop.

U.S Pat. No. 4,748,425 to Heck shows a VCO range shift and modulation device for use with a PLL frequency synthesizer VCO.

U.S. Pat. No. 4,689,581 to Talbot shows an integrated circuit PLL timing apparatus. FIG. 1 shows the PLL connected with a microcomputer on a single chip.

U.S. Patent to Turney discloses a phase locked loop with an out of lock detector control of the loop filter and divider. In this patent, the control unit 26 does not sense the VCO control voltage. The frequency of the reference source (the frequency which is input to phase locked loop) is fixed.

U.S. Pat. No. 4,654,859 to Kung discloses a frequency synthesizer for a frequency hopping communication system. In this patent, a microprocessor controller is provided which changes the count N in the feedback divider circuit. However, the microprocessor controller 34 merely changes the divide count N in some predetermined sequence so that data can be transmitted in a "frequency-hopping" fashion.

SUMMARY OF THE INVENTION

An object of the present invention is the provision of a demodulator which will, after acquisition, dynamically track data rate changes originating from the modulator.

Another object of the invention is to provide a demodulator which will track data rate changes over a continuous spectrum; a continuous wide spectrum.

Briefly, this invention contemplates the provision of a demodulator which automatically tracks incoming data rate changes by using information from a bit synchronizer to track the incoming base band data signal. An adjustable matched filter filters the demodulated phase encoded data signal in order to enhance the signal-to-noise ratio. A phase locked loop, which includes a voltage controlled oscillator and a variable counter to divide the oscillator output, tracks the filtered data signal to generate a data clock signal. A controller responsive to the incoming data rate adjusts the count in the divider and the pass band of the filter to match the incoming data rate.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
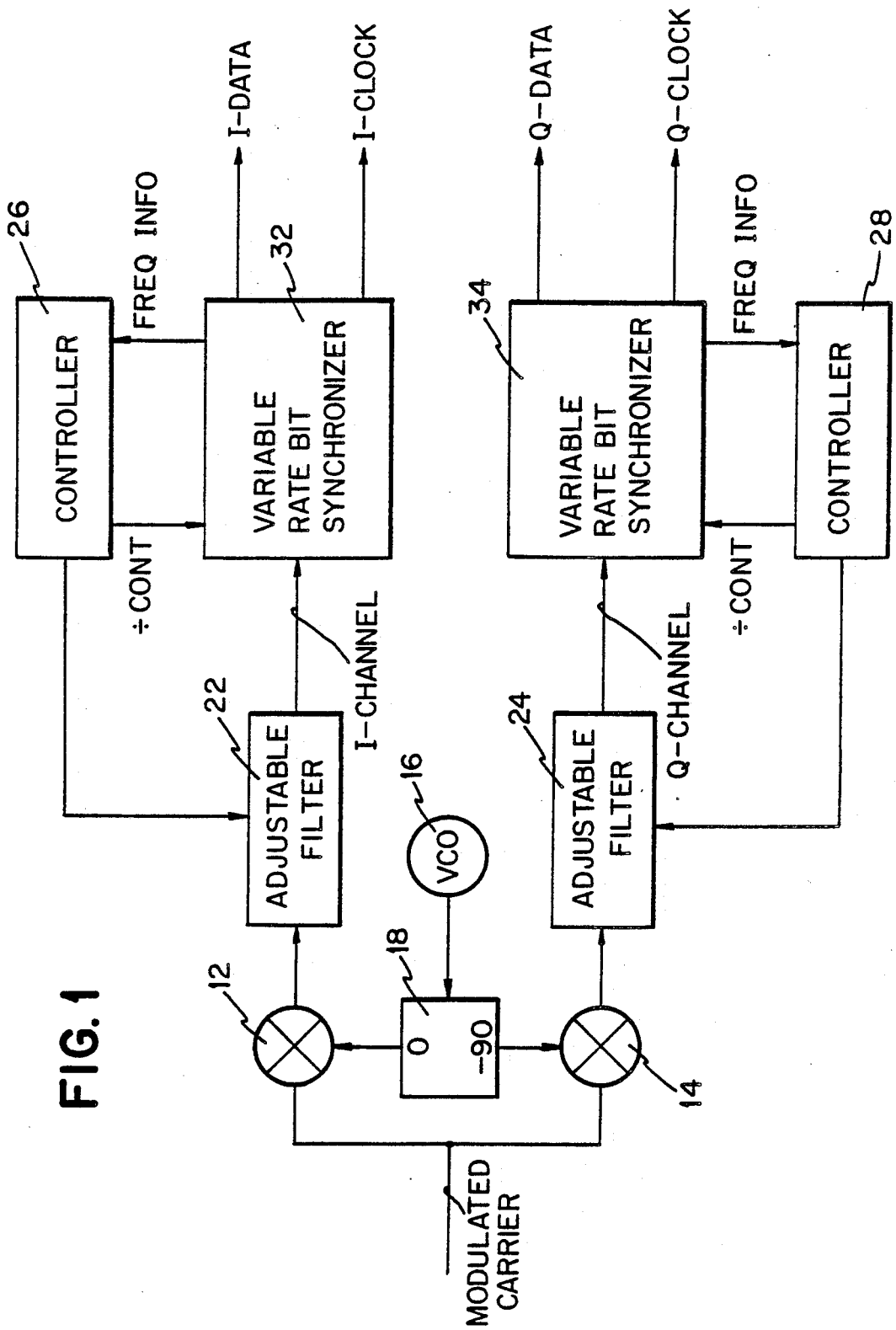
FIG. 1 is a block diagram of a demodulator constructed in accordance with the teachings of this invention.

Referring now to the drawings, and more particularly to FIG. 1, there is shown a specific embodiment of the invention in which a Phase Shift Key (PSK) modulated carrier is quadrature downconverted to baseband I and Q channels using a standard loop which includes mixers 12 and 14, a voltage controlled oscillator (VCO) 16 locked to the incoming carrier, and a 90 degree phase shifter 18. Adjustable filters 22 and 24 are matched to the incoming data rate and are used to filter each channel. The filters may be either analogue or digital filters. For a band limited signal, the filters are preferably two pole Butterworth filters with 3 db points at one half the data rate. The pass band of the filters changes to match the baseband frequency in order to optimize the signal to noise ratio at the output of the filter. Suitable adjustable matched filters are disclosed in copending U.S. patent application Ser. No. 367,404 filed June 15, 1989, and assigned to the assignee of this application.

Controllers 26 and 28 adjust the filters 22 and 24, respectively, to match the incoming data rate. As will be explained in more detail in connection with FIGS. 2 and 3, the controllers get baseband frequency information from bit synchronizers 32 and 34, respectively, and use this information to fine tune the filter data rate. The system of this invention is applicable to BPSK, QPSK, and M-ary phase encoding. For QPSK, a variable rate bit synchronizer on each channel allows operation with different data rates on the I and Q channels. While the two controllers are shown in FIG. 1, a single controller may, if desired, serve both channels. Since the circuitry and operation of each channel is the same, the subsequent explanation of our invention is referenced to a single channel.

Figure 2:
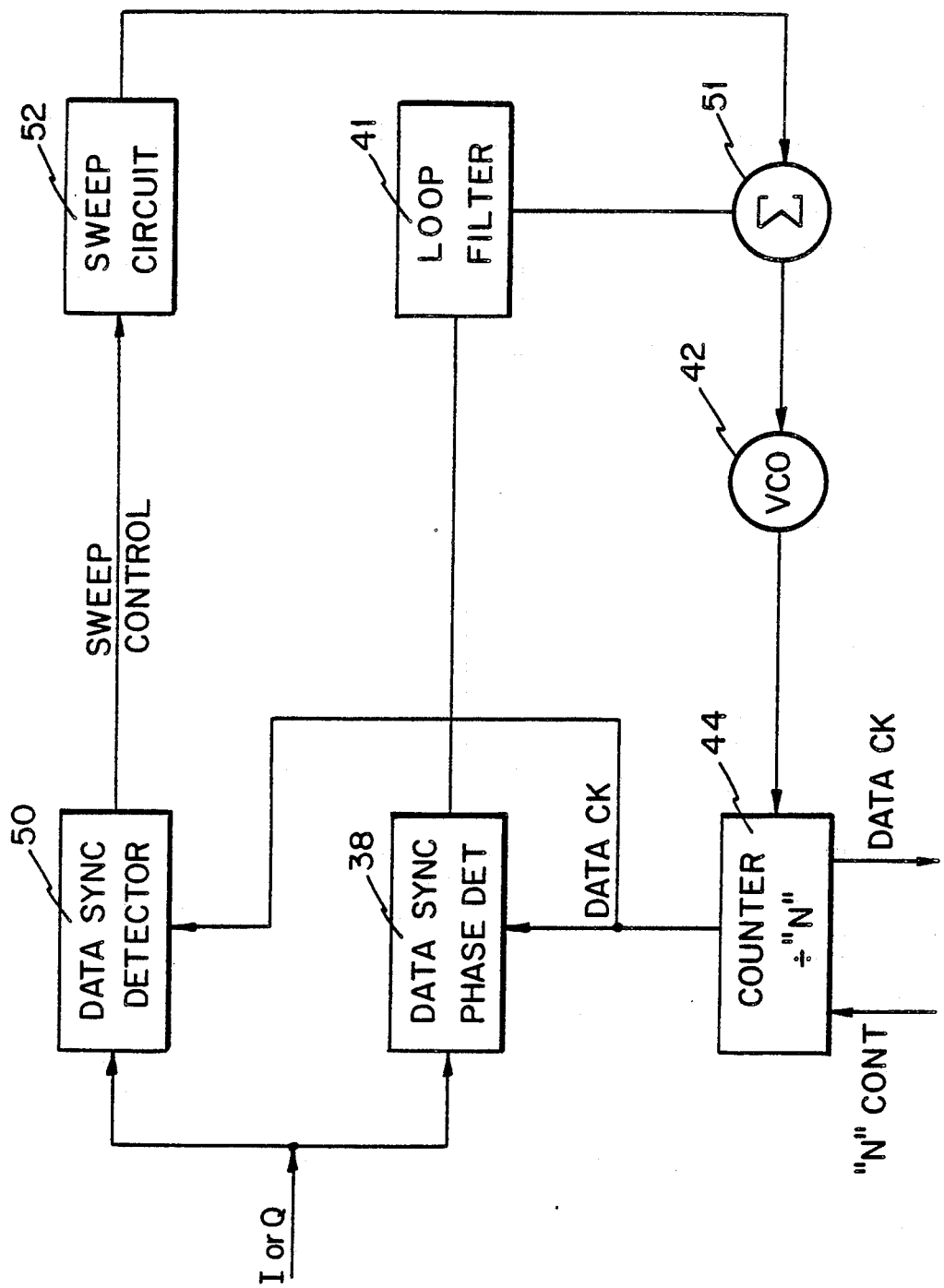
FIG. 2 is a block diagram of a variable rate bit synchronizer and controller in accordance with the teachings of this invention.

Referring now to FIG. 2, each variable rate bit synchronizer comprises a phase detector 38, a loop filter 41, a VCO 42, and a programmable counter 44 which divides the frequency of the VCO 42 by the number "N" programmed into the counter. The phase detector 38 may be an early/late gate phase detector, or other suitable phase detector known in the prior art. Continuous coverage of the baseband frequency is possible over a wide range as a result of using the VCO in combination with the programmable counter. The VCO has a center frequency ($F_c$) and a range of coverage, i.e., a deviation bandwidth (dbw). By making the programmable counter's division ratio "N" greater than the VCO's center frequency to deviation bandwidth ratio ($N > F_c/dbw$), the data clock signal frequency, which is the quotient of the VCO output divided by "N", overlaps for successive values of "N", thereby providing continuous coverage.

In order to cover a wide range of data rates, a bit synchronizing detector 50 and a frequency sweep circuit 52 initially are used to generate a synchronous data clock locked to incoming data signal. As will be appreciated by those skilled in the art, in this initializing operation the sweep circuit 52, which is coupled to the VCO via a summing junction 51, varies the output of the VCO until detector 50 detects that the frequency of the data clock output divided by counter 44 is synchronized with the incoming data signal.

Figure 3:
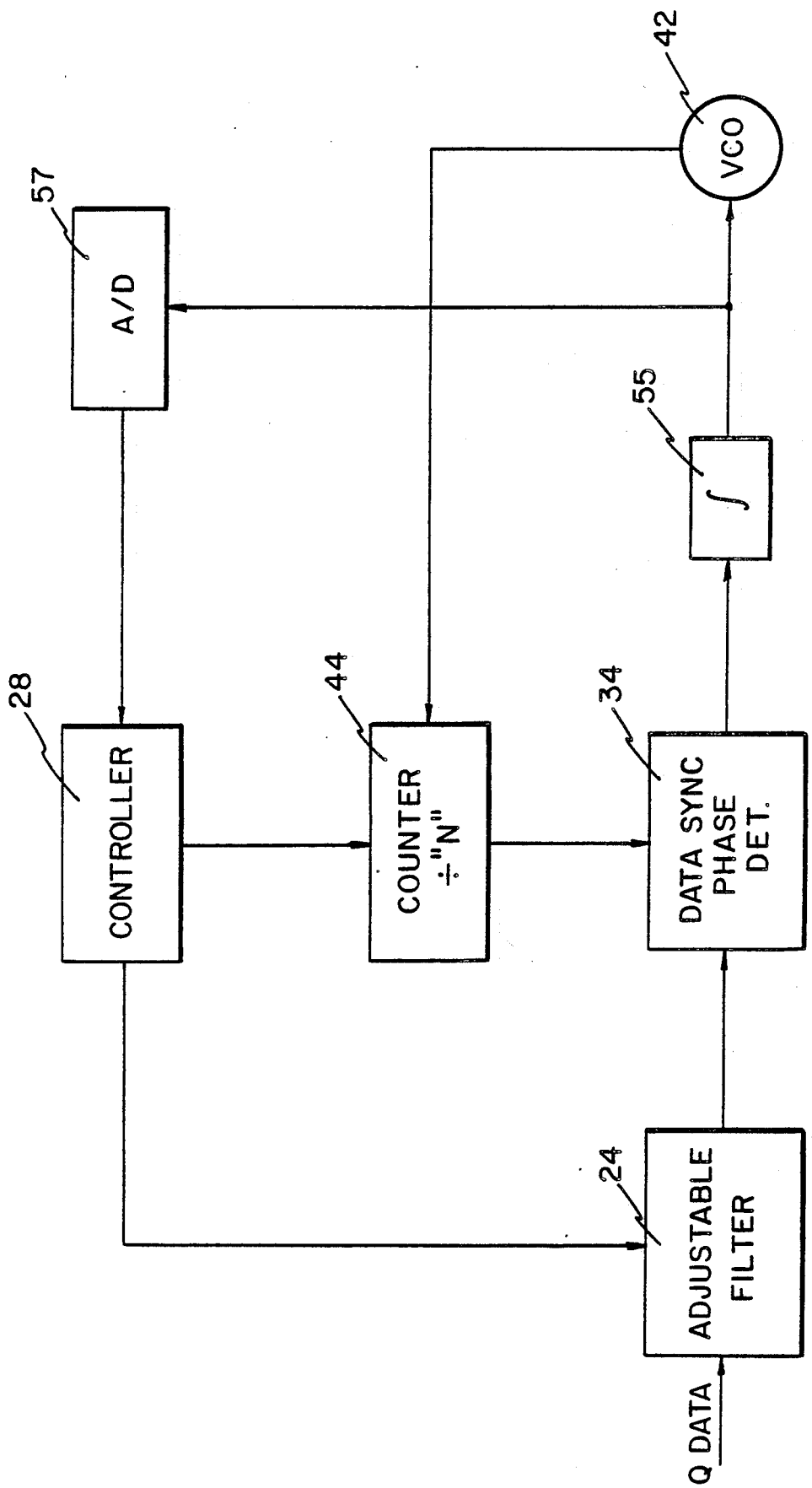
FIG. 3 is a block detail similar to FIG. 2 but showing more details of the variable rate bit synchronizer.

Referring now to FIG. 3, the function of the controller is two-fold. It adjusts the count "N" of divide by N counter 44 so that the input to the VCO stays within its deviating band width. It also adjusts the filter to match the input data rate. The controller, either 26 or 28, may comprise a microprocessor relabelled 54. The microprocessor controller 54 senses the input voltage to the VCO 42. An integrator 55 integrates the output of the phase detector 38, and the integrated phase detector output is the VCO input and is also coupled via an analogue to digital converter 57 as an input to processor 54. Processor 54 compares this VCO input to high and low limits and changes the count in the divide by N counter 44 so that it stays within the deviation band width of the VCO. The VCO output divided by the count N in counter 44 is synchronized to the frequency of the incoming data signal. This VCO output divided by N is the data clock signal.

The counter 44 count "N" is also coupled as input to microprocessor controller 54. The microprocessor controller uses this count along with the input voltage to the VCO to calculate the data rate and control of the adjustable matched filter 24 so that it is matched to input data rate frequency.

In operation, the controller 54 sets initial values for the matched filter 24 and the programmable divider counter 44. The sweep circuit 52 initially provides a varying voltage input to the VCO which sweeps the VCO in conjunction with the programmable divider 44 through a range of frequencies until the bit synchronizer indicates lock up. After acquisition, the controller 54 monitors the count in divider 44 and the input voltage to the VCO 42. From these two factors, the incoming data rate is determined and used to adjust the filter to the matched data rate. In addition, the microprocessor varies the count "N" in the divider 44 to maintain the input to VCO 44 within its deviation band width while maintaining the data clock synchronous with the incoming data rate. As previously mentioned, the value of "N" in the counter is always larger than the VCO center frequency to deviation band width ratio.

While the invention has been described in terms of a single preferred embodiment, those skilled in the art will recognize that the invention can be practiced with modification within the spirit and scope of the appended claims.

What is claimed is:

1. A self-clocking system for demodulating phase encoded data signals which have a variable frequency, comprising in combination;

means for generating a baseband data signal;

means coupling said baseband signal to an input of a filter having a pass band matched to the frequency of said phase encoded data signal, said filter producing a filtered output data signal in response to said baseband signal input;

means for comparing said filtered output data signal with a clock signal, said comparing means producing an output voltage which is a function of a phase difference between said filtered output data signal and said clock signal;

means for coupling the output of said filter to the input of said comparing means;

a variable counter;

a voltage controlled oscillator, means for coupling said comparing means output voltage to the input of said voltage controlled oscillator;

means for coupling an output of said voltage controlled oscillator to an input of said variable counter, which counter divides the output of said oscillator by a count "N" to generate said clock signal; and a controller responsive to said comparing means output to vary said pass band of said filter to match said phase encoded data signal frequency and to vary "N" to maintain the voltage input to said voltage controlled oscillator within the deviation band width of said voltage controlled oscillator.

2. A self-clocking system for demodulating phase encoded data signals which have a variable rate, as in claim 1 wherein said controller computes said data frequency from the voltage controlled oscillator input voltage and the count "N" in said counter.

3. A self-clocking system for demodulating phase encoded data signals which have a variable rate, as in claim 1, wherein values of "N" are larger than the voltage controlled oscillator center frequency to deviation band width ratio.

* * * * *